(12) United States Patent
Khosla

(10) Patent No.: US 7,647,227 B1
(45) Date of Patent: Jan. 12, 2010

(54) MACHINE ASSISTED SPEECH GENERATION FOR A CONVERSATIONAL VOICE RESPONSE SYSTEM

(75) Inventor: Ashok Mitter Khosla, Palo Alto, CA (US)

(73) Assignee: Tuvox, Inc., San Jose, CA (US)

( * ) Notice: Subject to any disclaimer, the term of this patent is extended or adjusted under 35 U.S.C. 154(b) by 596 days.

(21) Appl. No.: 10/819,685

(22) Filed: Apr. 6, 2004

(51) Int. Cl.
*G10L 21/06* (2006.01)

(52) U.S. Cl. .................................... 704/270.1
(58) Field of Classification Search ............... 704/270.1
See application file for complete search history.

(56) References Cited

U.S. PATENT DOCUMENTS

| | | | |
|---|---|---|---|
| 5,596,634 A | | 1/1997 | Fernandez et al. |
| 6,269,336 B1 | | 7/2001 | Ladd et al. |
| 6,292,783 B1 | | 9/2001 | Rohler et al. |
| 6,324,513 B1 | | 11/2001 | Nagai et al. |
| 6,567,805 B1 | | 5/2003 | Johnson et al. |
| 6,594,348 B1 | * | 7/2003 | Bjurstrom et al. ........ 379/88.13 |
| 6,895,084 B1 | | 5/2005 | Saylor et al. |
| 6,983,307 B2 | * | 1/2006 | Mumick et al. ............. 709/205 |
| 7,020,841 B2 | * | 3/2006 | Dantzig et al. .............. 715/727 |
| 7,050,976 B1 | * | 5/2006 | Packingham ................ 704/270 |
| 7,058,890 B2 | * | 6/2006 | George et al. ............... 715/728 |
| 7,174,323 B1 | * | 2/2007 | Schultz et al. ................. 705/75 |
| 7,246,063 B2 | * | 7/2007 | James et al. ............. 704/270.1 |
| 7,251,604 B1 | * | 7/2007 | Thenthiruperai ......... 704/270.1 |
| 7,289,606 B2 | * | 10/2007 | Sibal et al. ..................... 379/52 |
| 2001/0049688 A1 | | 12/2001 | Fratkina et al. |
| 2002/0154153 A1 | | 10/2002 | Messinger et al. |
| 2002/0188599 A1 | | 12/2002 | McGreevy |
| 2003/0182124 A1 | | 9/2003 | Khan |
| 2004/0083092 A1 | | 4/2004 | Valles |

\* cited by examiner

*Primary Examiner*—Susan McFadden
(74) *Attorney, Agent, or Firm*—Hahn and Moodley LLP; Vani Moodley

(57) ABSTRACT

In one embodiment, the invention provides a method for building a speech application. The method comprises reading data from a table; creating a data construct that models the structure of the table, in terms of fields contained therein; providing a user interface (UI) to display the structure of the table to a user; receiving a selection of data fields from the user; and automatically generating code for a voice browser (VB) based on the selection.

13 Claims, 6 Drawing Sheets

MACHINE ASSISTED SPEECH GENERATION FOR A CONVERSATIONAL VOICE RESPONSE SYSTEM

FIELD OF THE INVENTION

This invention relates to the building of speech applications. In particular, the invention relates to the scripting of a speech application for a conversational voice response system, using a markup language.

BACKGROUND

A conversational voice response (CVR) system comprising a voice user interface (UI) which allows a user to have a dialogue or conversation with the system in order to identify and play back audio/voice content of interest, has been described in U.S. patent application Ser. No. 10/319,144, which is hereby incorporated by reference.

Such a CVR system may, advantageously, be used to make available, in audio form, a vast amount of information/content currently residing within databases, in table form. However, specialized database access scripting skills are required in order to design the CVR system to access a database, in addition to the skills required to design a speech application for the CVR. The applicants have found that the two skills are not easily found in a single person, and thus, the interfacing of CVR systems with databases is being hampered.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment the invention provides a method for building a speech application, in which a table from a database is read, and a database object (called a dob) is created to model or mirror the structure of the table. The method includes using the dob to automatically generate navigation topics for a voice browser (VB) to guide or inform a user (hereinafter "the VB user") of content topics available for browsing using the VB. The navigation topics correspond to fields in the table. One advantage of the method is that specialized database access scripting skills are not required to interface the speech application to the database. Other advantages of the method will be apparent on the detail description below.

Figure 1:
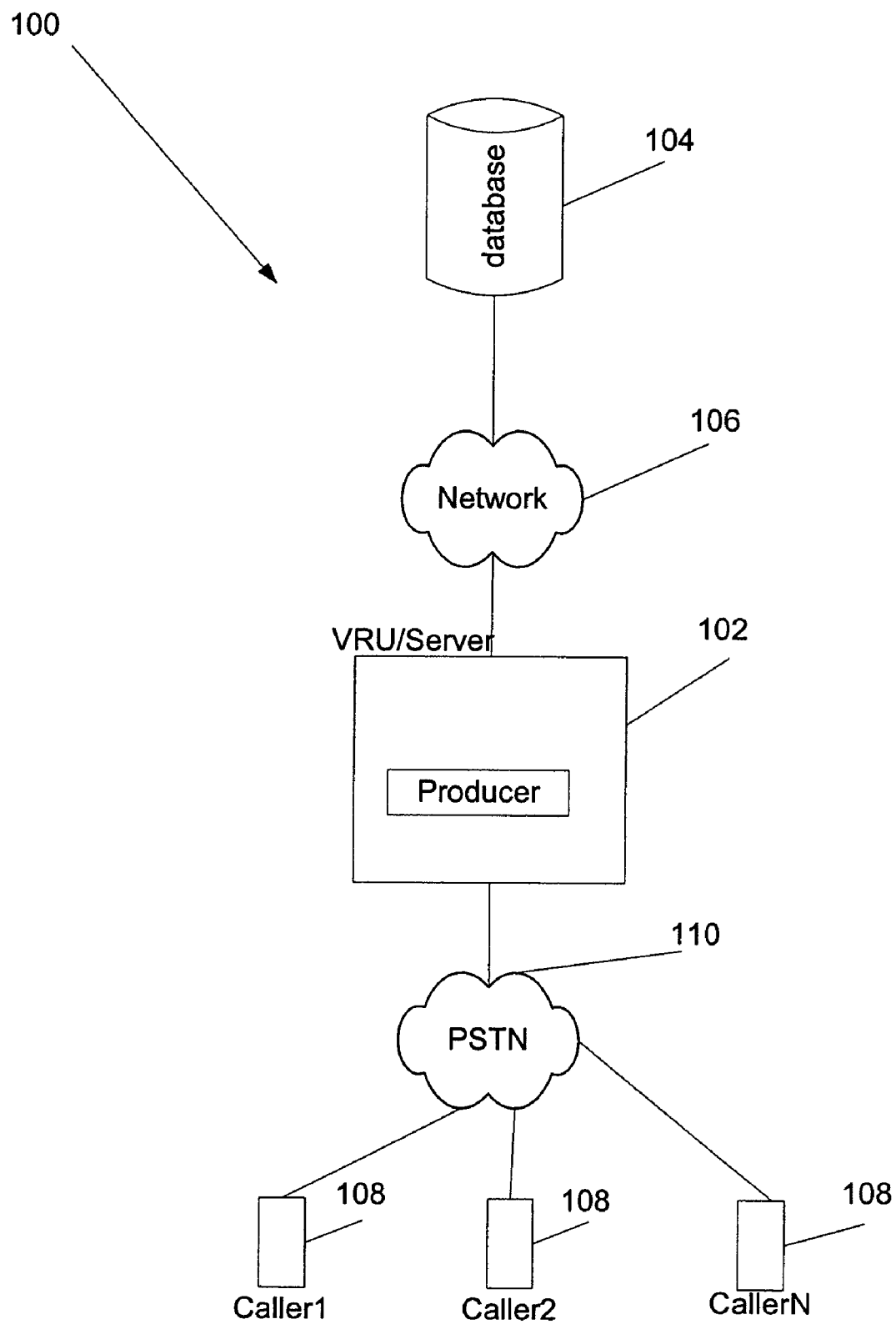
FIG. 1 shows a high level block diagram of a network architecture within which embodiments of the present invention may be practiced.

FIG. 1 of the drawings shows a network architecture 100 within which embodiments of the present invention may be practiced. As well be seen, the architecture 100 includes a voice response unit (VRU)/server 102 which is capable of accessing a database 104 through e.g. a wide area network (WAN) 106, using a defined communications protocol such as the Transmission Control Protocol over the Internet protocol (TCP/IP). A plurality of callers/users 108 are able to establish a communications session with the VRU 102 through an intermediate network such as a public switched telephone network (PSTN) 110. Components of the VRU 102 includes a software tool known as Producer, which may be used in the production of speech applications for a conversational voice response (CVR) system of which the VRU 102 may be a part. Hardware that may be used to implement the VRU 102 is described below, with reference to FIG. 4 of the drawings.

Figure 2:
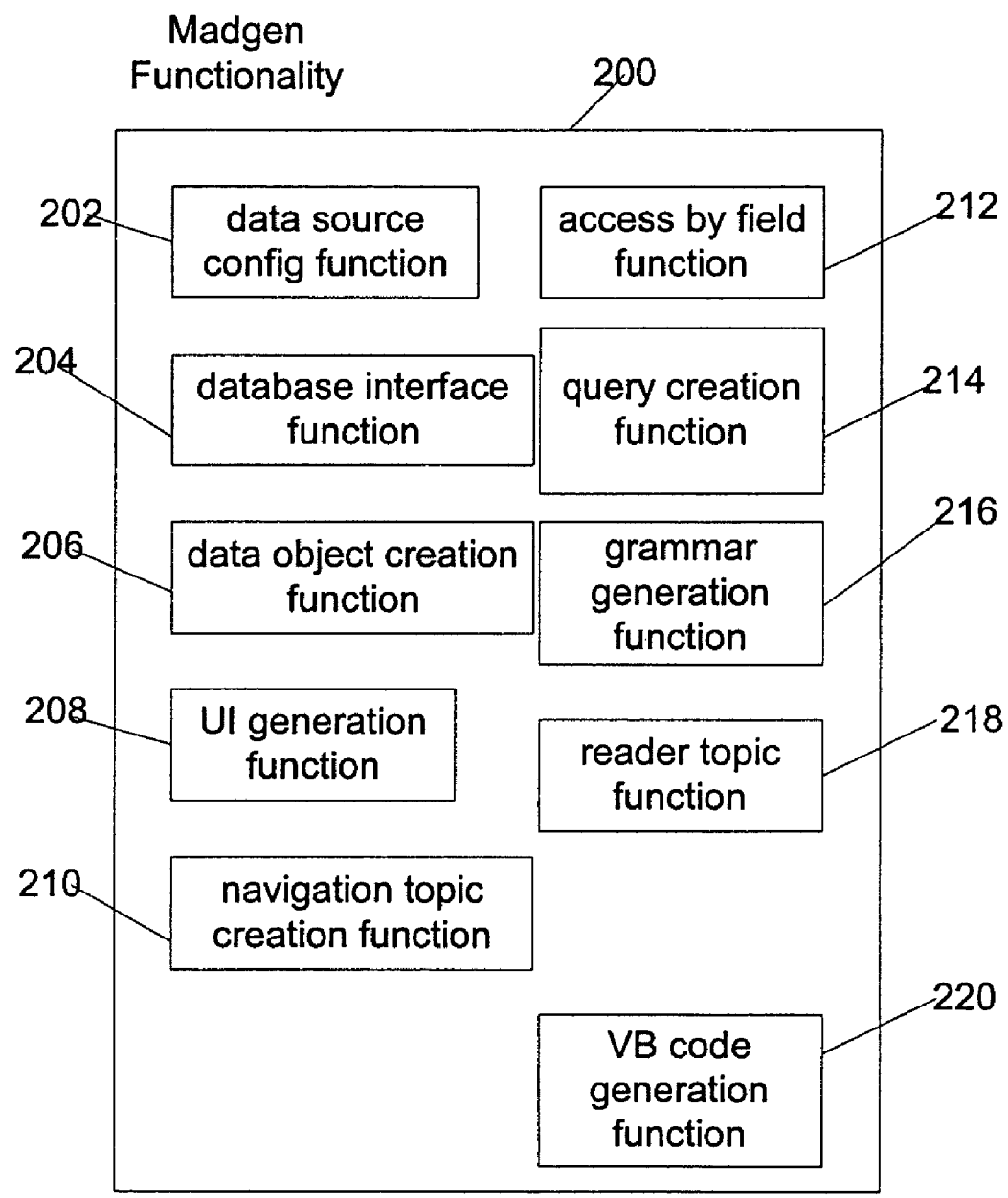
FIG. 2 shows the functional blocks within an implementation of a machine-assisted dialogue-generation function, in accordance with one embodiment of the invention.

Producer embodies a machine-assisted dialogue-generation function, known as Madgen. FIG. 2 of the drawings shows the functional blocks within an implementation 200 of Madgen. As well be seen the implementation 200 includes a data source configuration function 202, a database interface function 204, a data object creation function 206, a user interface (UI) generation function 208, a navigation topic creation function 210, a query creation function 214, an access by field function 212, a grammar generation function 216, and a prompt indexing function 218, a reader topic function 220, and a VB code generation function 222. Each of these functions will be explained below.

The Data Source Configuration Function 202

This function is used to configure Producer to access a particular data source, for example the database 104 in FIG. 1 of drawings. The data source configuration function 202 through the UI generation function 208 presents a user with an interface to facilitate configuration of the data source. Through the interface, the user may configure a location of the data source for example by inputting a uniform resource locator (URL) of the data source, and by configuring driver applications to communicate with the data source.

The Database Interface Function 204

The database interface function 204 includes an interface to read a configured data source, using configured drivers in order to determine what tables are available in the data source. The database interface function 204 also included an interface to retrieve particular dobs from a data source.

The Data Object Creation Function 206

Figure 3:
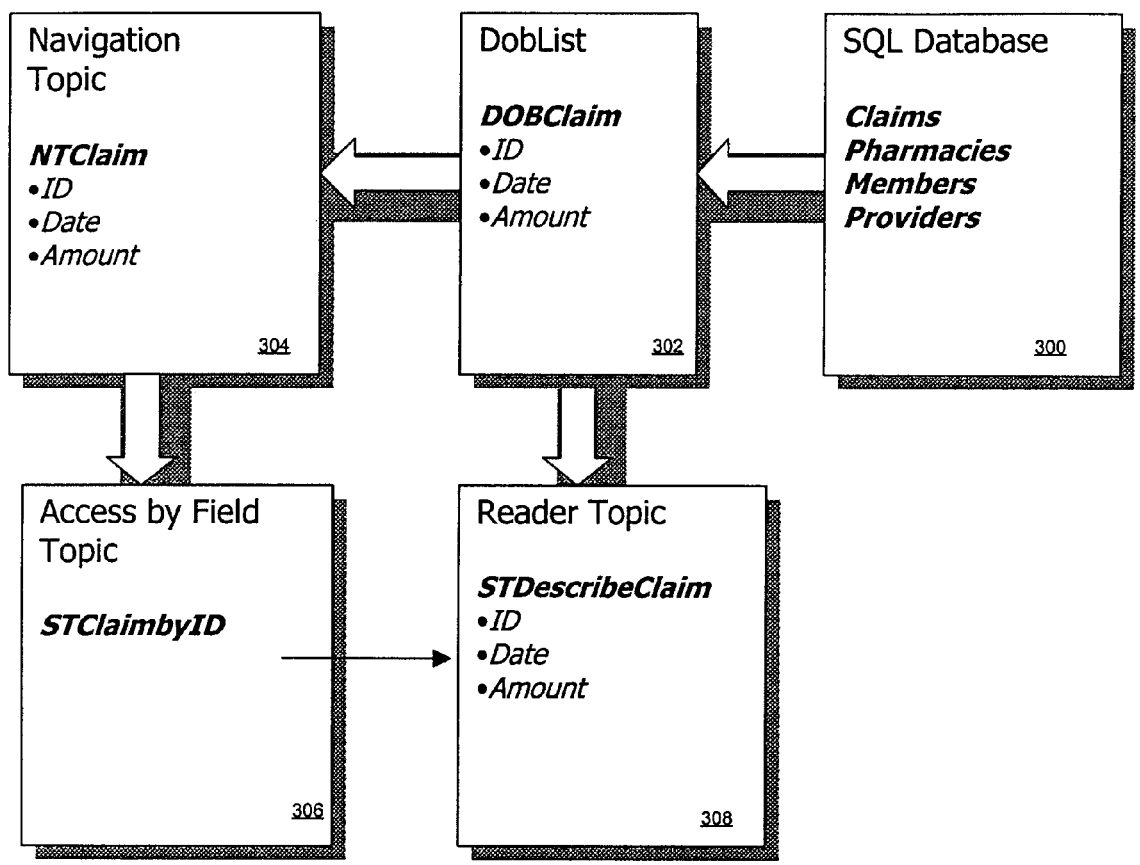
FIG. 3 illustrates how a voice browser (VB) for browsing contents of a database may be automatically generated, in accordance with one embodiment of the invention.

This function automatically creates a dob based on table information in the data source. For example, referring to FIG. 3 of the drawings, assume that the data source comprises a Structured Query Language (SQL) database 300 that contains a table of claims, a table of pharmacies, a table of members, and a table of providers. In this case, the data object creation function 206 will through the UI generation function 208, present an interface to the user to enable the user to select a table of interest. Suppose that the table of interest selected by the user is the claims table, then the data object creation function 206 will create a dob list which includes a dob called DOBClaim which is based on the claims table DOBClaim will contain the fields from the claims table. In other words, DOBClaim contains the fields: ID, date, and amount as is shown in block 302 in FIG. 3 of the drawings.

The User Interface (UI) Generation Function 208

This function works together with the other functions in order to present an interface to the user to present information to the user, and to receive user input of selected information.

The Navigation Topic Creation Function 210

The navigation topic creation function 210 allows the user to select particular fields of a dob that are to be used by a VB user to navigate or browse through voice content. For example, the user may select the fields of the dob "DOB-Claim," in which case the navigation topic creation function 210 creates an object called NTClaim which includes the navigation topic's ID, date, and amount to facilitate navigation through the fields of the DOBClaim.

The Access by Field Function 212

This function allows a user to specify a dob, and a field of interest with which to access the dob. This function will be explained in greater detail below.

The Query Creation Function 214

This function allows a user to define a query to a configured data source. The query may be defined using an outline structure or a table structure to identify the components required by the query. Components of the query creation function includes a database-to-outline translator and an outline-to-database translator. In one embodiment, the following query tags are available through the query creation function 214 to facilitate the creation of a query:

1. A "Table" tag to identify which tables a query should use.
2. A "Select" tag to select fields for the query. Multiple fields may be selected.
3. A "From" tag to specify one or more tables a query should include.
4. A "Where/Equals" tag to include conditional statements in a query e.g. "where X>Y" can be formulated with a "Where" tag as "Where X, with a child>tag whose value is Y."
   Where X
     Equals Y
   In addition to the standard comparison operators =, >=, >, !=, etc. the following Comparison Tags are allowed as children of a Where
     Sounds like (minimum distance, soundex (what is soundex) or similar)
     String match—Starts with, Ends with, Contains
     Relating to (ontologic)
5. A "Group by" tag to create groups of multiple items.
6. A "Sort by" tag to specify a field to sort the results of a query tag.

In another embodiment, the query creation function 214 generates computer program code (e.g., Java code), which can be modified by a computer programmer.

The Grammar Generation Function 216

This function enables the conversion of lists of data into grammars. This function supports the generation of three types of grammars: Simple replies, natural language replies, or "FastSpell" replies (i.e. my name is "j o h n"). The data may be imported from e.g. a SQL database.

The Reader Topic Function 218

This function is used to play back or "read" selected data from a database to a VB User.

The Voice Browser (VB) Code Generation Function 220

This function automatically compiles SXML code generated using the machine-assisted dialogue-generation function 200 into VXML.

An example of how to simulate an interface to browse through a database table, in accordance with one embodiment of the present invention is provided in Appendix 1.

Figure 4:
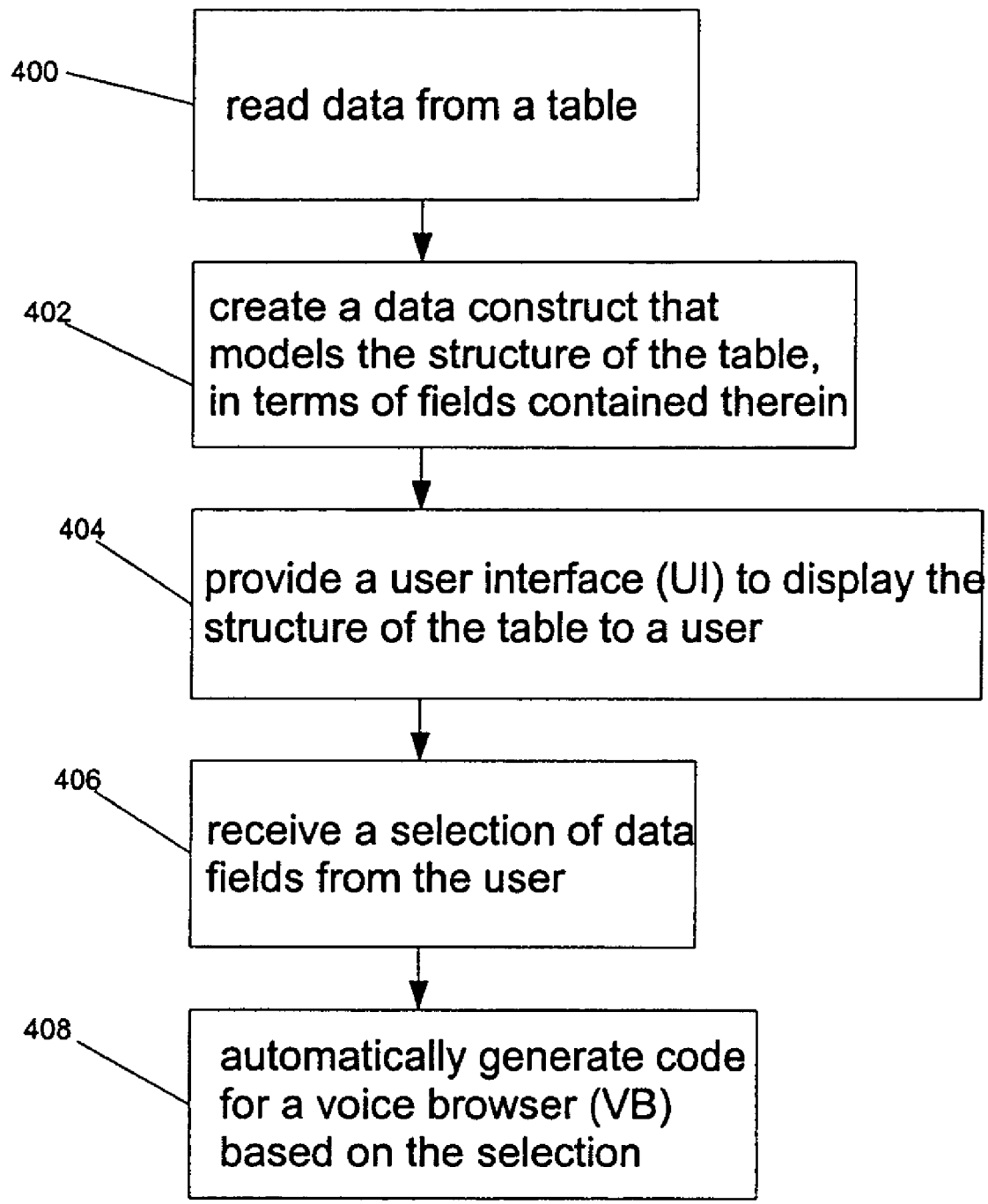
FIGS. 4 and 5 show flow charts of operations performed by the machine-assisted dialogue-generation function of FIG. 2.

FIG. 4 of the drawings show the operations performed in one embodiment, when building a speech application using the Madgen implementation 200. Referring to FIG. 4 at block 400 data from a table in a database is read. At block 402 a data construct e.g. a dob, that models the structure of the tables, in terms of fields contain therein is created. At block 404, a user interface (UI) is provided to display the structure of the table to a user. At block 406, a selection of data fields from the user is received. At block 408, code for a voice browser (VB) based on the selection is automatically generated.

Figure 5:
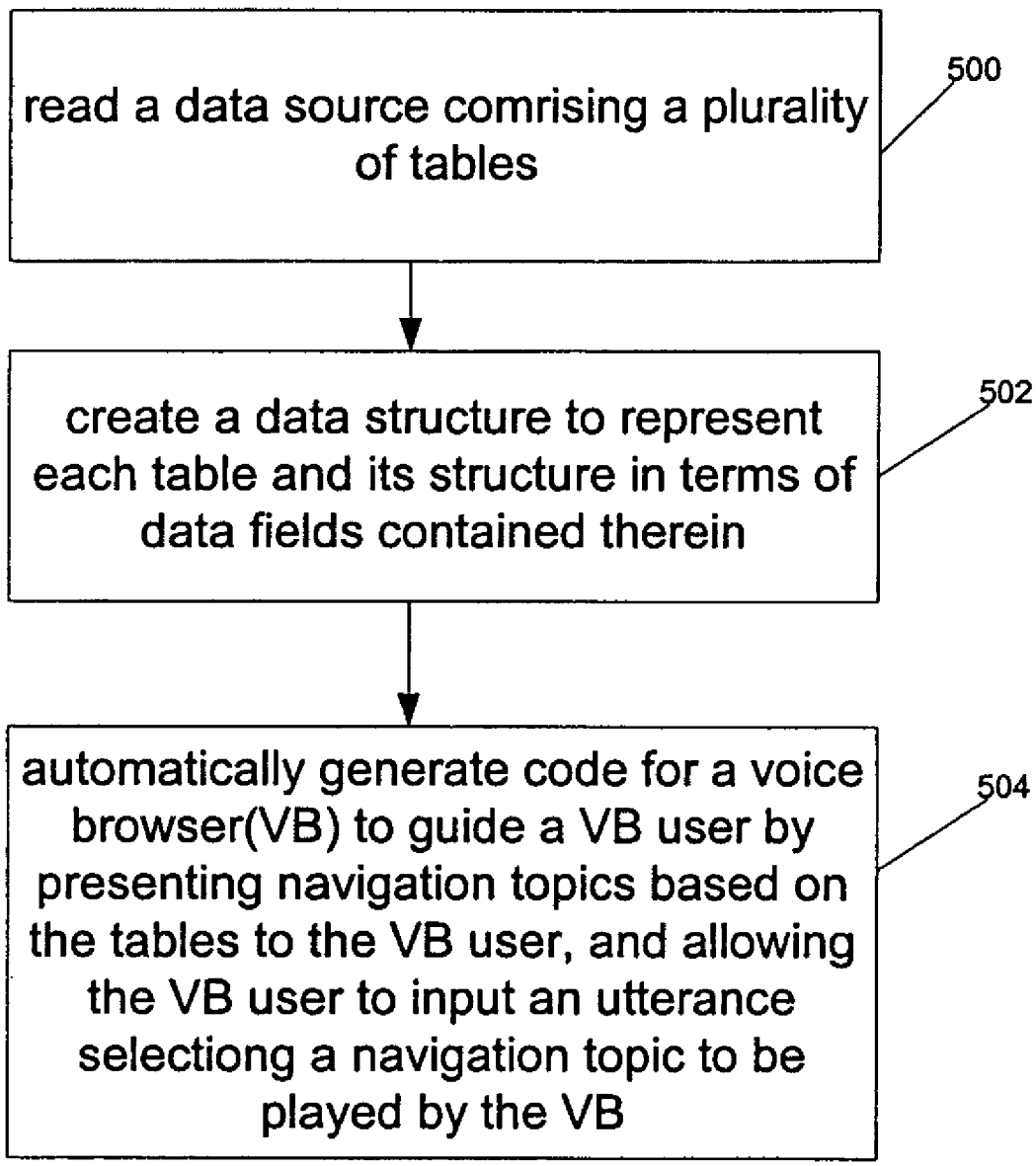
Figure 6:
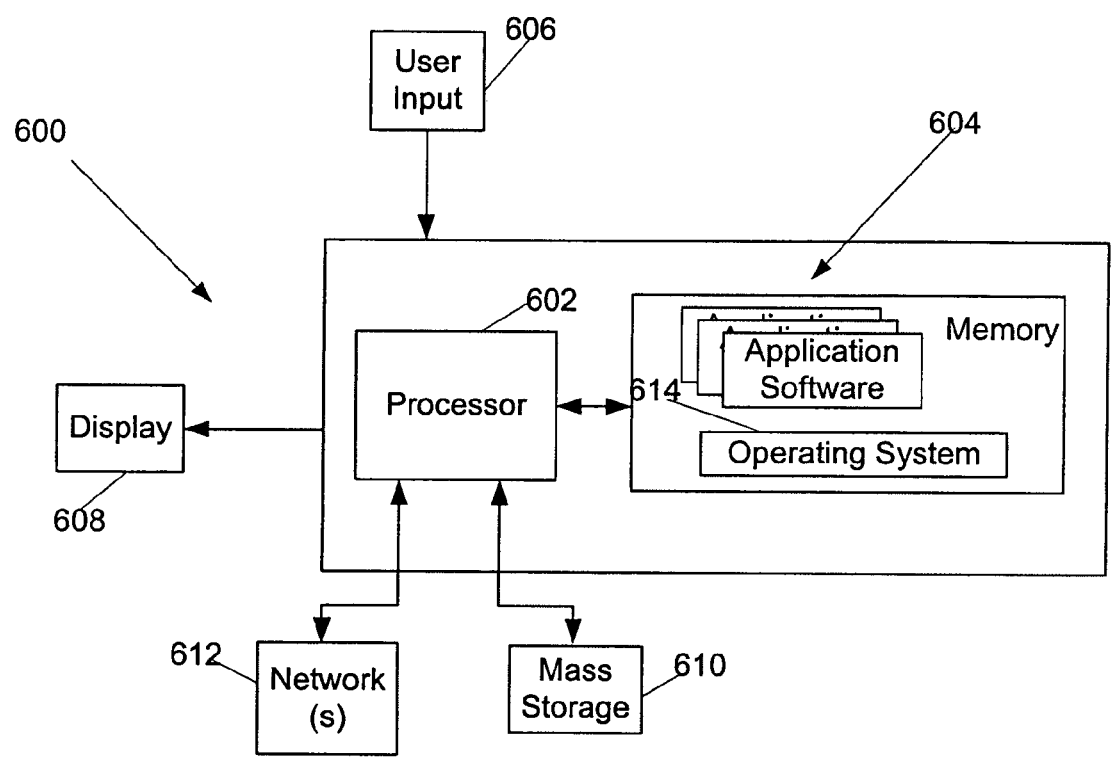
FIG. 6 shows a high level block diagram of hardware that may be used to implement the server 102 of FIG. 1.

Referring to FIG. 5 of the drawings there is shown, another embodiment for building a speech application, using the Madgen implementation 200. Referring to FIG. 5, at block 500, a data source, such the data source 104 is read. The data source comprises a plurality of tables. At block 502, a data construct e.g. a dob, is created to represent each table and structure in terms of data fields contained therein. At block 504, code for a voice browser (VB) is automatically generated. The code is to guide a DB user by presenting navigation topics based on tables to the DB user Referring to FIG. 6 of the drawings, reference numeral 600 generally indicates hardware that may be used to implement the VRU 102, in accordance with one embodiment. The hardware 600 typically includes at least one processor 602 coupled to a memory 604. The processor 602 may represent one or more processors (e.g., microprocessors), and the memory 604 may represent random access memory (RAM) devices comprising a main storage of the hardware 600, as well as any supplemental levels of memory e.g., cache memories, non-volatile or back-up memories (e.g. programmable or flash memories), read-only memories, etc. In addition, the memory 604 may be considered to include memory storage physically located elsewhere in the hardware 600, e.g. any cache memory in the processor 602, as well as any storage capacity used as a virtual memory, e.g., as stored on a mass storage device 610.

The hardware 600 also typically receives a number of inputs and outputs for communicating information externally. For interface with a user or operator, the hardware 600 may include one or more user input devices 606 (e.g., a keyboard, a mouse, etc.) and a display 608 (e.g., a Cathode Ray Tube (CRT) monitor, a Liquid Crystal Display (LCD) panel).

For additional storage, the hardware 600 may also include one or more mass storage devices 610, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 400 may include an interface with one or more networks 612 (e.g., a local area network (LAN), a wide area network (WAN), a wireless network, and/or the Internet among others) to permit the communication of information with other computers coupled to the networks. It should be appreciated that the hardware 600 typically includes suitable analog and/or digital interfaces between the processor 602 and each of the components 604, 606, 608 and 612 as is well known in the art.

The hardware 600 operates under the control of an operating system 614, and executes various computer software applications 616, components, programs, objects, modules, etc. (e.g. a program or module which performs operations described above). Moreover, various applications, components, programs, objects, etc. may also execute on one or more processors in another computer coupled to the hardware 600 via a network 612, e.g. in a distributed computing environment, whereby the processing required to implement the functions of a computer program may be allocated to multiple computers over a network.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although the present invention has been described with reference to specific exemplary embodiments, it will be evident that the various modifications and changes can be made to these embodiments without departing from the broader spirit of the invention as set forth in the claims. Accordingly, the specification and drawings are to be regarded in an illustrative sense rather than in a restrictive sense.

APPENDIX 1

In one embodiment, to simulate a CVR Finder interface, a DobList called DOBSubjectToTopic is used. The DobList DOBsubjectToTopic is a table whose fields are Subject, ClosestTopic, ParentTopic, and GrandparentTopic. Its DataSource may be SubjectToTopic.txt—the document created by Producer from SubjectToTopic and TopicHierarchy.

Sample SXML usage of this DataObject:
Concept—CTFinder
Ask What subject can I help you with?
   Datatype FinderSubjects A grammar generated in Producer using Extend/Make Data Type Assistant . . .
   StoreAt SubjectFound A local variable
FetchData DOBSubjectToTopic Fetch DOBs from SubjectToTopic table. Retrieve only 1 object back.
   Where DOBSubjectToTopic #Subject=SubjectFound Query condition—optional
   Failure #NoSubjectFound If no objects are found where do we go? This label is required
Set MyClosestTopic=DOBSubjectToTopic#ClosestTopic Get the ClosestTopic field of the DataObject
Guidance The closest topic I have to that is
Guidance TVFinderTitles# MyClosestTopic
Indexed prompting from prompt library using a Concept Variable as the index
Ask To get that, say "get that" or say "more choices"
   Reply get that
     Jump Value(MyClosestTopic) Need Value ( )—Indirection conflicts with CT Jumps
   Reply more choices
     Set
       MyNextChoice=DOBSubjectToTopic#ParentTopic
       Note that we don't fetch DOBSubjectToTopic again.
     Guidance Ok. The next closest topic I have to that is
     Guidance TVFinderTitles# MyNextChoice
Label Success
Return
Label NoSubjectFound
Guidance I'm sorry . . . . Let's try again . . . .
Data Topic Objects
A sample Dob topic will help us to get started
DataObject DOBMemberClaims
   What's the Datasource—in this case it's a SQL query
     DataSource SQL
     Driver org . . . mm. etc
     Database URL
     Etc.
   When you do a Fetch DataSource the following code gets executed!
   You can have named and un-named Fetch's. Named fetches allow different queries.
   Unnamed fetches, as well as the first FetchData in this topic are considered to be the default FetchData.
   FetchData TheWholeEnchilada
     SQLQuery SELECT presentMemberID, Count (*), pharmacyCode, eligibleDate FROM Member Table
     There are no "where" "sort", or "group" clauses here. You could add these clauses to the line above or add them using the FetchData/OverData statement
     Assign field members of the data object from the query.
     Field MemberID=presentMemberID
       Datatype is optional but recommended if you are going to access this field using speech
       DataType Number
     Field Pharmacy=pharmacyCode
       DataType Pharmacies
     Field EligibilityDate=eligibleDate
       DataType Date
     The assignment from SQL query to Field is by string match not semantic. So this expression is allowed.
     Field NumberClaims=Count (*)
A DataObject save is similar in fashion
Save
   The assignment from SQL query to Field is by string match not semantic. So this expression is allowed.
   SQLQuery INSERT . . . Values (MemberID, Pharmacy . . . into . . .
The Over Data Tag
   You can iterate over a list of DataObjects. To do this, instead of saying FetchData/Where . . . . You would say OverData/Where
For example,
OverData DOBRecentClaims Fetch DOBs from SubjectToTopic table. Retrieve only 1 object back.
   Where DOBRecentClaims #MemberID=CTMemberID Query condition—optional There is no failure condition—a lack of data just exits the loop
Set MyClaimNumber=SayOrdinalNumber (DOB RecentClaims#Index)
Guidance The
Guidance TVNumbers#MyClaimNumber
Guidance claim's date was on
Guidance SayDate (DOBRecentClaims# EligibilityDate)
When the OverData clause is out of objects, it moves on to the next statement Iteration is performed by the app server "caching" the DobList of the OverData query. The VRU caches (in the topics VXML memory) a corresponding "index". If it's positive it calls the app server to do a "FetchData" using its corresponding DataObject Index. The first time the OverData "loops", it fetches the first object in the DobList. On subsequent iterations the VXML interpreter increments the DobList index cursor, and fetches the next object. When no more objects are available (no objects in the list, or the end of the list), it exits the OverData block.

Data Object Topics
A sample Dob topic will help us to get started
DataObject DOBMemberClaims
   What's the Datasource—in this case it's a SQL query
   DataSource SQL
      Driver org . . . mm. etc
      Database URL . . .
      Etc.
   When you do a Fetch DataSource the following code gets executed!
   You can have named and un-named Fetch's. Named fetches allow different queries.
   Unnamed fetches, as well as the first FetchData in this topic are considered to be the default FetchData.
   FetchData TheWholeEnchilada
      The SQLQuery tag shows the final query in "display mode". In expand mode the query consists of several sub tags. See Query Designer below
      SQLQuery SELECT presentMemberID, Count (*), pharmacyCode, eligibleDate FROM MemberTable
      There are no "where" "sort", or "group" clauses here. You could add these clauses to the line above or add them using the FetchData/OverData statement
      Assign field members of the data object from the query.
      Field MemberID=presentMemberID
         Datatype is optional but recommended if you are going to access this field using speech
         DataType Number
Madgen from SQL Data Source
To create DataObjects from a SQL source:
1.) Add the database to the list of project databases (Select Extend/Databases menu)
   a. Add the database name, user, password
   b. Add the drivers/database URLs
2.) Select Extend/Import Database Objects . . .
   a. Select database
      i. The program displays a list of all accessible database tables when a database is selected
   b. Select SQL style (initially support MySQL, Oracle)
   c. Select tables (a list that shows up when you select database)
   d. Press "GO"—all database object topics are created. Each column in the table becomes a field in the Dob. (You can later delete unwanted fields)
   e. The SQL save and restore code will be automatically generated in the Database object topic in the specified SQL style (i.e. Oracle)
3.) You can now edit the DataObject topic as you wish
Madgen from Data Object Navigation Topic to Access by Field Topic To generate a subject topic that delivers a particular DataObject given a field, you need three things: the DataObject, the Field used as a search/Where key, and the datatype of the field. For example a claim record has a Claim DataObject, the ClaimID, and the ClaimID datatype, a number.
STGetClaimByClaimID
PlayTopic CTClaimID//MADGen Generated from (optional) DataType defined in DataObject Field declaration
Over DOBClaimID
Where DOBClaimID
   Equals CTClaimID
Guidance. Ok The
Guidance SayOrdinal(DOBClaimID#Index) Says "first, "second", etc.
Guidance claim is dated on
Guidance SayDate(DOBClaimID#ClaimDate)
Confirm Would you like to hear the claim details?
   Agree Yes
   PlayTopic STDescribeClaimRecord

What is claimed is:

1. A method for building a speech application, the method comprising:
   accessing a database;
   reading data from a table in the database;
   creating a data construct that models the structure of the table, in terms of fields contained therein;
   displaying the structure of the table to a user;
   receiving a selection of data fields from the user, the data fields to form the basis of navigation topics for voice browsing; and
   automatically generating code for a voice browser (VB) based on the selection; wherein the code enables the VB to guide a VB user by presenting the selection of fields to the VB user and allowing the VB user to utter a choice from the selection to be played.

2. The method of claim 1, further comprising reading a data source and automatically generating prompts therefrom for use in the generation of the code.

3. The method of claim 1, wherein the code is in a markup language.

4. The method of claim 1, further comprising reading a data source and automatically generating a grammar therefrom for use in the generation of the code.

5. A method for building a speech application, the method comprising:
   accessing a database comprising a plurality of tables;
   creating a data construct to represent each table and its structure in terms of data fields contained therein;
   displaying the tables to a user for selection each table selected by the user to form the basis of navigation topics for voice browsing; and
   receiving input from the user selecting tables that are to be presented as navigation topics by the VB; and responsive to the input automatically generating code for a voice browser (VB) to guide a VB user by presenting navigation topics based on the tables to the VB user, and allowing the VB user to input an utterance selecting a navigation topic to be played by the VB.

6. The method of claim 5, further comprising providing a user interface (UI) to display the data construct to a user.

7. The method of claim 6, wherein automatically generating the code is based on the input from the user.

8. A computer readable medium, having stored there on a sequence of instructions which when executed by a computer, cause the computer to perform a method for building a speech application, the method comprising:
    accessing a database;
    reading data from a table in the database;
    creating a data construct that models the structure of the table, in terms of fields contained therein;
    displaying the structure of the table to a user;
    receiving a selection of data fields from the user, the data field to form the basis of navigation topics for voice browsing; and
    automatically generating code for a voice browser (VB) based on the selection; wherein the code enables the VB to guide a VB user by presenting the selection of fields to the VB user and allowing the VB user to utter a choice from the selection to be played.

9. A system, comprising:
    a processor; and
    a memory coupled to the processor, the memory storing instructions which when executed by the processor cause the processor to perform a method for building a speech application, the method comprising:
    accessing a database comprising a plurality of tables;
    creating a data construct to represent each table and its structure in terms of data fields contained therein;
    displaying the tables to a user for selection, each table selected by the user to form the basis of navigation topics for voice browsing; and
    automatically generating code for a voice browser (VB) to guide a VB user by presenting navigation topics based on the tables to the VB user, and allowing the VB user to input an utterance selecting a navigation topic to be played by the VB.

10. The system of claim 9, further comprising providing a user interface (UI) to display the data construct to a user.

11. A system, comprising:
    a processor; and
    a memory coupled to the processor, the memory storing instructions which when executed by the processor, causes the system to perform a method for building a speech application, the method comprising:
    accessing a database;
    reading data from a table in the database;
    creating a data construct that models the structure of the table, in terms of fields contained therein;
    displaying the structure of the table to a user;
    receiving a selection of data fields from the user, the data fields to form the basis of navigation topics to be used for voice navigation; and
    automatically generating code for a voice browser (VB) based on the selection;
    wherein the code enables the VB to guide a VB user by presenting the selection of fields to the VB user and allowing the VB user to utter a choice from the selection to be played.

12. A computer readable medium, having stored there on a sequence of instructions which when executed by a computer, cause the computer to perform a method for building a speech application, the method comprising:
    accessing a database comprising a plurality of tables;
    creating a data construct to represent each table and its structure in terms of data fields contained therein;
    displaying the tables to a user for selection, each table selected by the user to form the basis of navigation topics for voice browsing; and
    automatically generating code for a voice browser (VB) to guide a VB user by presenting navigation topics based on the tables selected by the user to the VB user, and allowing the VB user to input an utterance selecting a navigation topic to be played by the VB.

13. The computer readable medium of claim 12, further comprising providing a user interface (UI) to display the data construct to a user.

* * * * *